United States Patent [19]

Abe

[11] Patent Number: 4,924,830
[45] Date of Patent: May 15, 1990

[54] CYLINDER DISCRIMINATING SYSTEM FOR AN AUTOMOTIVE ENGINE

[75] Inventor: Kunihiro Abe, Higashimurayama, Japan

[73] Assignee: Fuji Jukogyo Kabushiki Kaisha, Tokyo, Japan

[21] Appl. No.: 341,144

[22] Filed: Apr. 20, 1989

[30] Foreign Application Priority Data

Apr. 30, 1988 [JP] Japan ............................ 63-109499

[51] Int. Cl.⁵ .............................................. F02P 9/00
[52] U.S. Cl. .................................. 123/414; 123/612; 73/117.3
[58] Field of Search ............... 123/414, 476, 612, 617; 73/117.3, 518, 519; 324/173, 174, 179

[56] References Cited

U.S. PATENT DOCUMENTS 4,365,602 12/1982 Stiller et al. .................. 123/414
4,615,318 10/1986 Imoto et al. .................. 123/414
4,766,865 8/1988 Härtel .......................... 123/476 X

FOREIGN PATENT DOCUMENTS 57-124208 8/1982 Japan.
2209191 5/1989 United Kingdom ........... 123/414

Primary Examiner—Willis R. Wolfe
Attorney, Agent, or Firm—Martin A. Farber

[57] ABSTRACT

A disk is secured to a camshaft of an engine, and a plurality of projections are provided on a periphery of the disk in angular ranges of a crankshaft which are out of angular ranges where the engine stops frequently. Projections in each range are arranged to indicate a specific cylinder of the engine. A sensor is provided for sensing the projections and for producing cylinder representing signal. A discriminator is provided for producing discriminating signals representing respective cylinders in accordance with the cylinder representing signals.

3 Claims, 5 Drawing Sheets

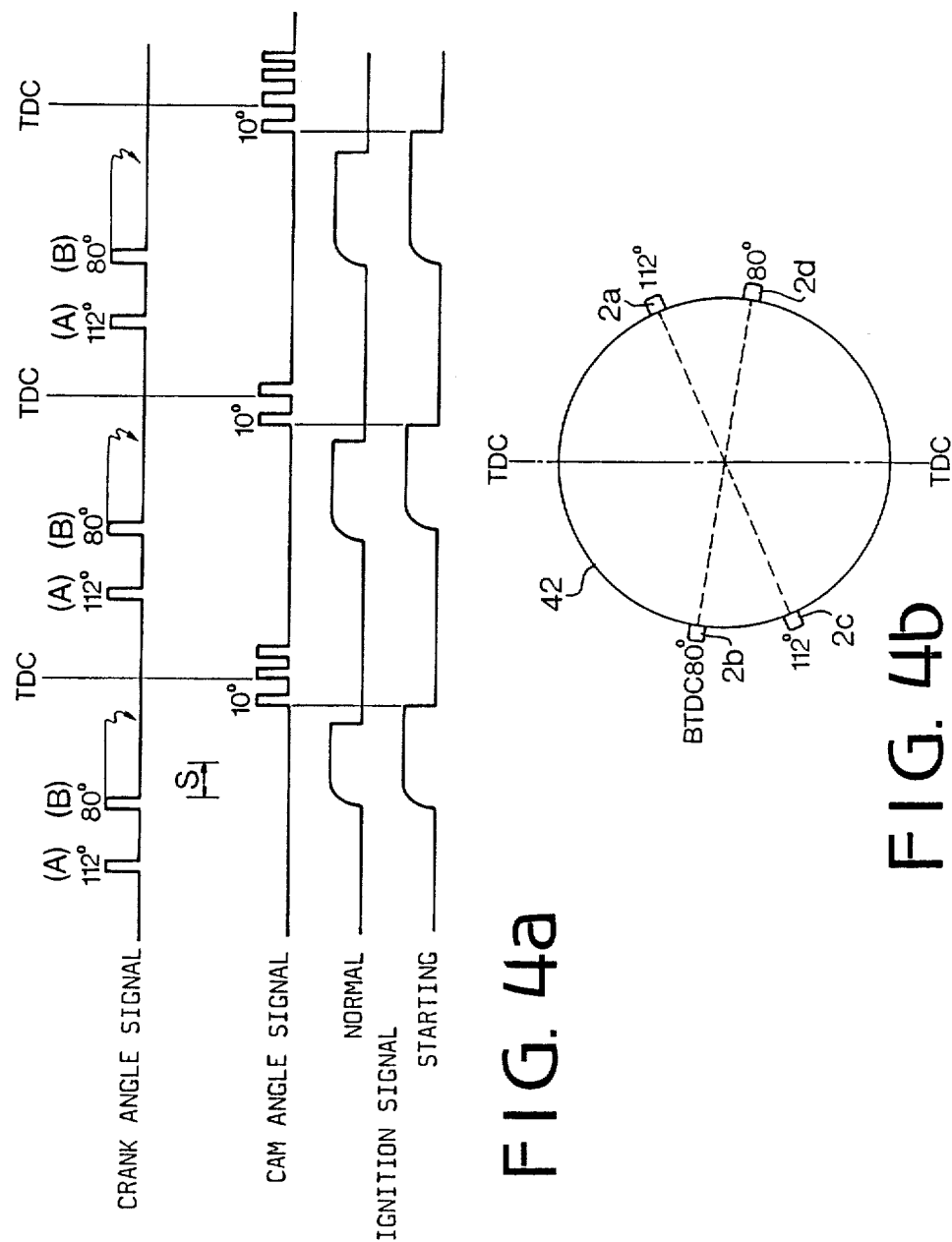

CYLINDER DISCRIMINATING SYSTEM FOR AN AUTOMOTIVE ENGINE

BACKGROUND OF THE INVENTION

The present invention relates to a system for detecting a crank angle relative to a specific cylinder of an engine for a motor vehicle, and more particularly to a system for discriminating a cylinder to be ignited.

Japanese Patent Application Laid-Open No. 57-124208 discloses a cylinder discriminating system in which a disk is provided to rotate once while a crankshaft of an engine rotates twice and to generate a crank angle signal in the form of pulses sensed by a sensing means. The crank angle signal is used for designating a cylinder within a discriminating range on the disk.

FIGS. 5a and 5b show a diagram in relation to the crank angle signal and a disk 52 secured to a crankshaft in a conventional system. The system has a cam shaft disk having projections and produces cam signal pulses CS for every cylinders. The crank angle signal CA in the form of pulses is generated at projections formed on the periphery of the disk 52 in an angular discriminating range of the crankshaft and the number of the pulses CS is counted to discriminate a corresponding cylinder. The angular discriminating range is shown by C in FIG. 5b, which is between 10° and 100° before the top dead center (BTDC) for the cylinder.

On the other hand, in a four-cylinder engine as an example, there is high probability that the engine stops near an angle of 70° before the top dead center on the compression stroke of a cylinder, which is included in the discriminating range C. Reference S in FIG. 5a designates an engine stop range in which the engine frequently stops. Accordingly, if the engine starts under the condition that the engine has stopped in the range S, the cam signal pulses may be counted in error. In other words, the counted number of the pulses may become less than the actual number thereof, because the pulses CS may be included in the stop range S. Thus, accurate ignition timing is not obtained, which causes backfire of the engine.

SUMMARY OF THE INVENTION

The object of the present invention is to provide a cylinder discriminating system which may eliminate the above described disadvantages of the prior art.

In accordance with the present invention, a cylinder discriminating range is located at a position where engines seldom stop, thereby accurately discriminating cylinders at the starting of the engine.

According to the present invention, there is provided a first disk provided to be rotated in synchronism with a crankshaft of said engine, first indicator means formed on said first disk and disposed in angular ranges of the crankshaft which are out of angular ranges where said engine stops frequently, a first sensor for sensing said first indicator means and for producing crank angle signal, first indicator means in each range being arranged to indicate a particular cylinder of said engine, a second disk rotated once while said crankshaft of the engine rotates twice, second indicator means formed on said second disk provided for discriminating respective cylinder at predetermined angle, second sensor for sensing said second indicator means and for producing cam angle signal, discriminator means responsive to said cam angle signal generated between said crank angle signals for producing discriminating signals representing respective cylinders.

In an aspect of the invention, first indicator means are projections formed on the periphery of the disk.

The other objects and features of this invention will become understood from the following description with reference to the accompanying drawings.

BRIEF DESCRIPTION OF DRAWINGS

FIGS. 3a, 3b, 4a, and 4b are diagrams showing ignition timing in relation to crank signals and cam signals.

DETAILED DESCRIPTION OF THE PREFERRED EMBODIMENTS

Figure 1:
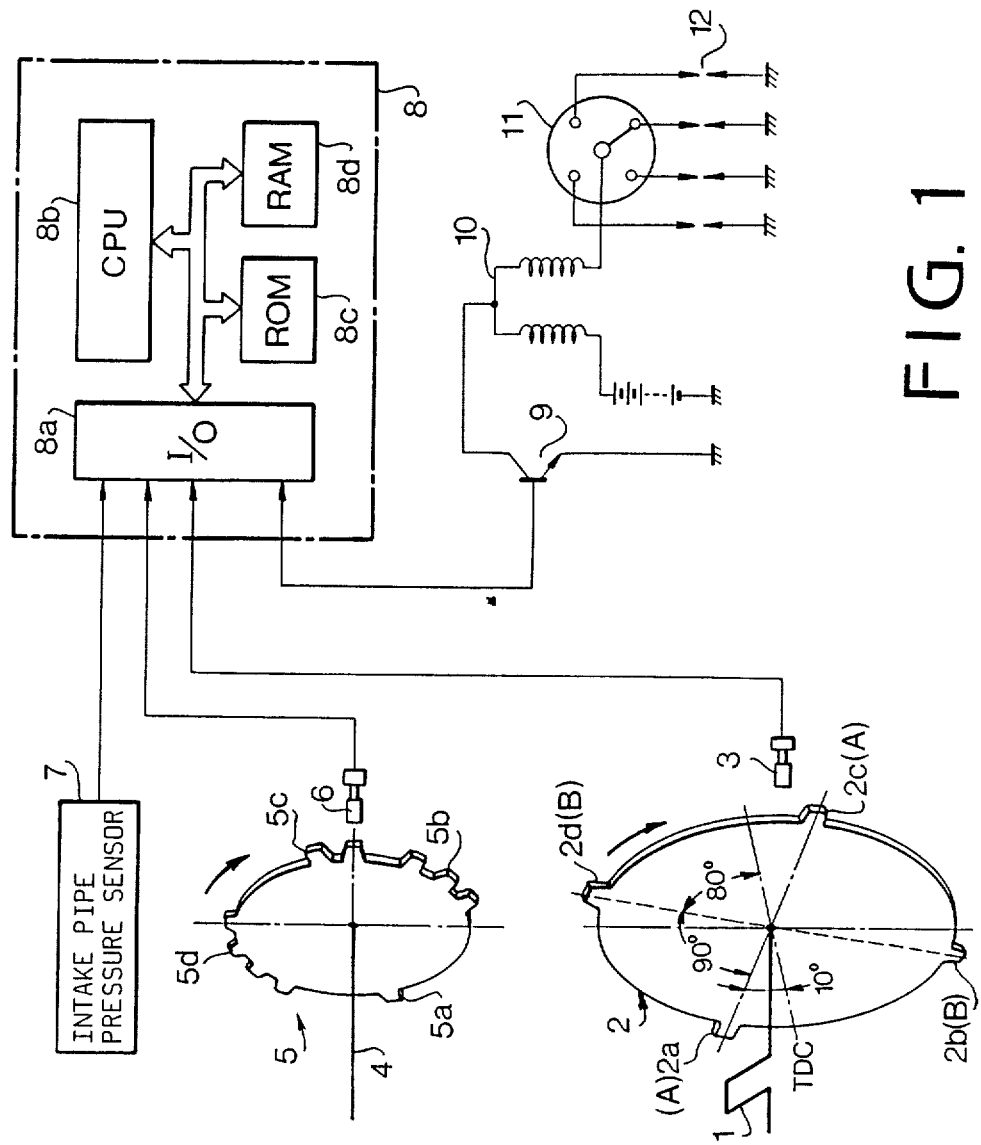
FIG. 1 is a schematic illustration of a system according to the present invention.
Figure 5A:
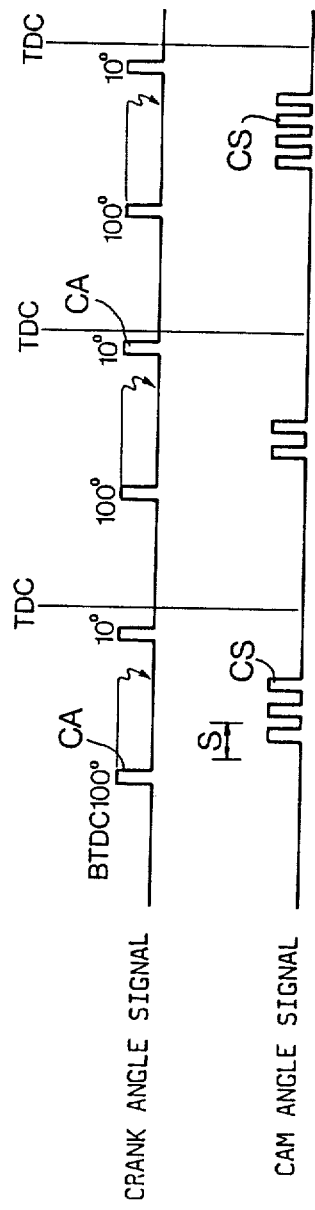
FIGS. 5a and 5b are diagrams showing crank angle signals and pulse counting ranges in a conventional system.
Figure 5B:
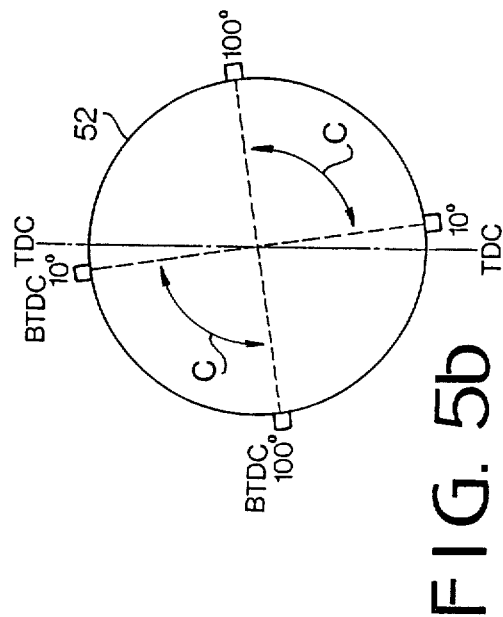

Referring to FIG. 1 showing a cylinder discriminating system for a four-cylinder engine for a motor vehicle according to the present invention, a crankshaft 1 of the engine has a crankshaft disk 2 secured thereto. Cylinders of the engine are divided into two groups. The first group consists of No. 1 and No. 3 cylinders, and the second group consists of No. 2 and No. 4 cylinders, in each group, top dead centers for both cylinders are the same timing. The crankshaft disk 2 has four projections 2a and 2b for the first group, and 2c and 2d for the second group which are formed on the outer periphery thereof. Each of projections 2a and 2c is 10° before the top dead center (BTDC) and each of projections 2b and 2d is 80° after the top dead center (ATDC). Between projections 2a and 2b and between projections 2c and 2d are cylinder discriminating ranges D1 and D2 (FIG. 3b) which are outside of the conventional discriminating ranges C (FIG. 5b).

Figure 3A:
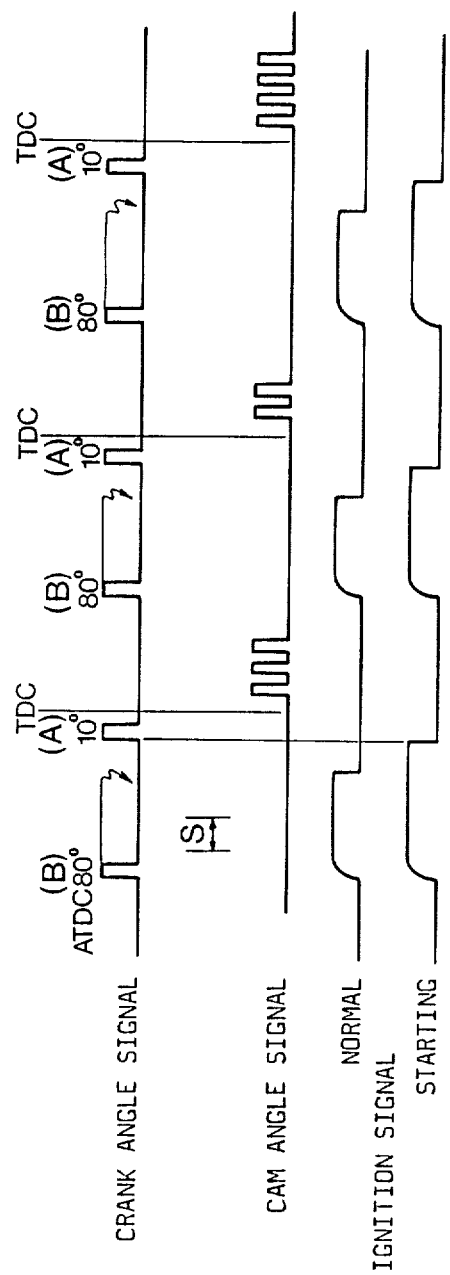
Figure 3B:
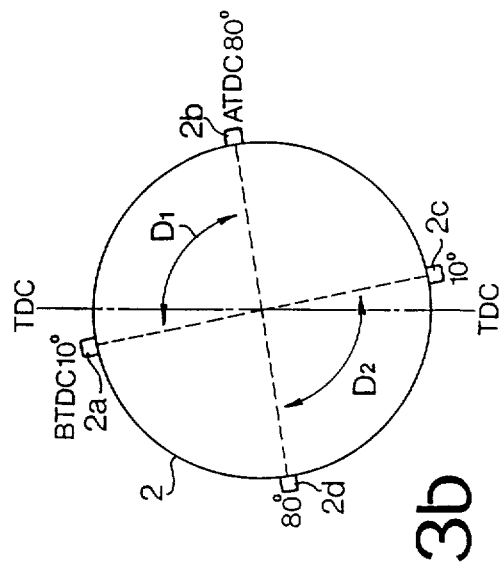

Accordingly, the ranges D1 and D2 do not include an engine stop liable range S. A crank angle sensor 3 is provided adjacent the crankshaft disk 2 for detecting the projections 2a to 2d to produce a crank angle signal at each projection in the form of pulses as shown in FIG. 3a.

A camshaft disk 5 is secured to a camshaft 4 for detecting cam angles. The camshaft 4 rotates once while the crankshaft 1 rotates twice. The camshaft disk 5 is provided with projections 5a, 5c, 5b and 5d formed on an outer periphery thereof. Projections 5a to 5d represent No. 1 to No. 4 cylinders, respectively. Projections 5a and 5c are formed in the range $D_1$ and projections 5b and 5d are in the range $D_2$. A cam angle sensor 6 is provided adjacent the camshaft disk 5 for detecting the projections 5a to 5d to produce a cam angle signal representing the number of the cylinder in the form of pulses as shown in FIG. 3a.

The crank angle signal and the cam angle signal from the sensors 3 and 6 and an intake pipe pressure signal detected by an intake pipe pressure sensor 7 are applied to an electronic control unit 8 comprising a microcomputer. The control unit 8 comprises an input/output interface 8a, a CPU 8b, a ROM 8c for storing control programs, and a RAM 8d for temporarily storing data. An ignition timing is calculated in accordance with a predetermined program and a timing signal is applied to a driver 9 comprising a power transistor. In accordance with the signal, the driver 9 is turned off to apply high-voltage surge to a spark plug 12 of a corresponding cylinder through an ignition coil 10 and a distributor 11.

Figure 2:
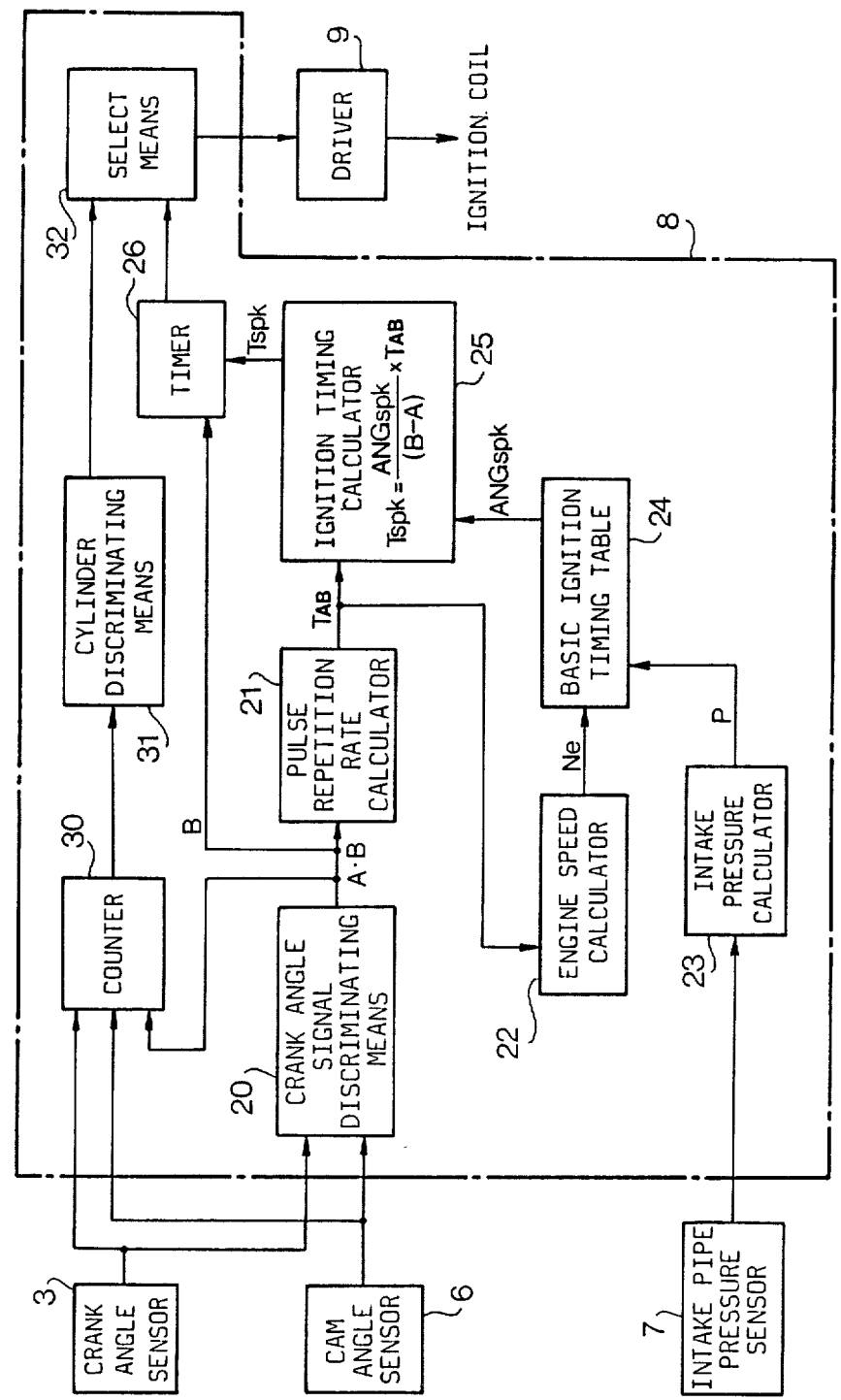
FIG. 2 is a block diagram of an electronic control unit.

Referring to FIG. 2, the control unit 8 comprises a crank angle signal discriminating means 20 applied with the crank angle signal from the crank angle sensor 3 and the cam angle signal from the cam angle sensor 6. The crank angle signal discriminating means 20 discriminates a crank angle signal A dependent on projection 2a or 2c from a crank angle signal B dependent on projection 2b or 2d in accordance with the cam angle signal. Namely, as shown in FIG. 3a, after a crank angle signal is detected, if a cam angle signal is not detected before the next crank angle signal is detected, the next crank angle signal is discriminated as crank angle signal A. If a cam angle signal is detected between the crank angle signals, the next crank angle signal is discriminated as crank angle signal B. These crank angle signals A and B are applied to a pulse repetition rate calculator 21 where a pulse repetition rate $T_{AB}$ is obtained in accordance with the time difference between an A signal detected time and a B signal detected time. That is to say, angular velocity of the crankshaft 1 is calculated. The pulse repetition rate $T_{AB}$ is applied to an engine speed calculator 22 for calculating an engine speed Ne.

The intake pipe pressure signal from the intake pipe pressure sensor 7 is applied to an intake pressure calculator 23 where an intake pressure P corresponding to engine load is calculated. On the basis of the intake pressure P and the engine speed Ne, a basic ignition timing angle $ANG_{SPK}$ is derived from a basic ignition timing table 24. The basic ignition timing angle $ANG_{SPK}$ is applied to an ignition timing calculator 25 to which the pulse repetition rate signal $T_{AB}$ from the pulse repetition rate calculator 21 is applied. An ignition timing $T_{SPK}$ after the B signal detected time is calculated as follows.

$$T_{SPK} = (ANG_{SPK}/(B-A)°) \times T_{AB}$$

The ignition timing $T_{SPK}$ is set in a timer 26 which starts measuring time in accordance with the crank angle signal B from the crank angle signal discriminating means 20. When the timer reaches a set ignition timing $T_{SPK}$, a spark signal is applied to the driver 9 for turning off the power transistor. The voltage surge is applied to the spark plug 12 of the cylinder.

At the starting of the engine, ignition operation is performed at the crank angle signal A time. When the crank angle signal B time is detected, the power transistor of the driver 9 is turned on to flow a current to the ignition coil 10.

In order to discriminate cylinders, the cam angle signals dependent on projections 5a to 5d are applied to a counter 30 where each cam angle signal is counted in the discriminating range $D_1$ or $D_2$. The cylinder is discriminated at a cylinder discriminating means 31 in accordance with the counted number of pulses. The counter 30 is applied with the crank angle signal A from the crank angle signal discriminating means 20 so that the counter 30 is reset to count the corresponding pulses. When the cylinder is discriminated at the cylinder discriminating means 31, an output signal is applied to a select means 32 where the corresponding cylinder is selected and a signal is applied to the driver 9 in accordance with a time measured by the timer 26.

Referring to FIGS. 4a and 4b showing a modification of the crankshaft disk, a crankshaft disk 42 is provided with four projections at 112° BTDC and 80° BTDC on the outer periphery thereof. Thus, projections 5a to 5d on the camshaft disk 5 must be positioned so as not to include the engine stop range S. Namely, the projections are provided after 10° BTDC.

In the embodiments described above, although the projections are formed on the disks secured to the crankshaft and the camshaft, the projections can be replaced with notches or slits formed on the crankshaft, camshaft, or other rotors rotated in synchronism with the crankshaft.

The system can be used for controlling fuel injection of the engine.

In accordance with the present invention, cylinder indicator means such as projections are provided in an angular range of the crankshaft which is out of a range where the engine stops most frequently. Thus, cylinders are exactly discriminated by the system at starting the engine to improve starting characteristics of the engine. Since the projections are not disposed in the ignition range, the ignition is not disturbed by the cylinder discriminating pulse signal.

While the presently preferred embodiments of the present invention have been shown and described, it is to be understood that these disclosure are for the purpose of illustration and that various changes and modifications may be made without departing from the scope of the invention as set forth in the appended claims.

What is claimed is:

1. A system for discriminating cylinders of an internal combustion engine, comprising:
   a rotary member provided to be rotated once while a crankshaft of said engine rotates twice;
   indicator means formed on said rotary member disposed in angular ranges of the crankshaft which are out of angular ranges where said engine stops frequently, the indicator means in each range being arranged to indicate a specific cylinder of said engine;
   a sensor for sensing said indicator means and for producing cylinder representing signals; and
   discriminator means responsive to said cylinder representing signals for producing discriminating signals representing respective cylinders.

2. The system according to claim 1, wherein said rotary member is a disk secured to a camshaft of said engine.

3. The system according to claim 2, wherein said indicator means are projections formed on a periphery of said disk.

* * * * *